(12) United States Patent
Keller et al.

(10) Patent No.: US 6,965,768 B1
(45) Date of Patent: Nov. 15, 2005

(54) ALLOCATION OF A CHANNEL FOR DATA CALLS WITH A DIFFERENT USEFUL SIGNAL/ DISTURB SIGNAL RATIO THAN FOR CHANNELS USED FOR VOICE CALLS IN MOBILE RADIO NETWORKS

(75) Inventors: Martin Keller, Düsseldorf (DE); Frank Lambrecht, Düsseldorf (DE); Stefan Leinenbach, Düsseldorf (DE); Joachim Richter, Hilden (DE); Robert Wahsner, Düsseldorf (DE)

(73) Assignee: Mannesmann AG, Düsseldorf (DE)

( * ) Notice: Subject to any disclaimer, the term of this patent is extended or adjusted under 35 U.S.C. 154(b) by 0 days.

(21) Appl. No.: 09/787,618

(22) PCT Filed: Aug. 30, 1999

(86) PCT No.: PCT/DE99/02795

§ 371 (c)(1),
(2), (4) Date: Sep. 25, 2001

(87) PCT Pub. No.: WO00/18153

PCT Pub. Date: Mar. 30, 2000

(30) Foreign Application Priority Data

Sep. 21, 1998 (DE) .................................. 198 45 796

(51) Int. Cl.⁷ .......................... H04Q 7/32; H04Q 7/20; H04Q 7/38

(52) U.S. Cl. ................... 455/423; 455/450; 455/452.1; 455/452.2; 455/509; 455/511; 455/512; 455/67.11

(58) Field of Search ............................... 455/423, 450, 455/451, 452, 414.1, 414.4, 422.1, 426.1, 455/426.2, 432.1, 403, 424, 425, 434, 452.1, 455/452.2, 453, 454, 63.1, 65, 67.11, 67.13, 455/67.14, 67.16, 67.7, 550.1, 9, 10, 509, 455/511, 512, 466

(56) References Cited

U.S. PATENT DOCUMENTS

| | | | | |
|---|---|---|---|---|
| 3,663,762 A | * | 5/1972 | Joel, Jr. ...................... 455/440 |
| 4,718,108 A | * | 1/1988 | Davidson et al. ............. 455/17 |
| 5,396,539 A | * | 3/1995 | Slekys et al. ............ 455/426.1 |
| 5,901,359 A | * | 5/1999 | Malmstrom ................. 455/461 |

* cited by examiner

*Primary Examiner*—Keith Ferguson
(74) *Attorney, Agent, or Firm*—Cohen, Pontani, Lieberman & Pavane

(57) ABSTRACT

An optimized utilization of the resources of a mobile radio network including a number of channels suitable both for the transmission of data and of voice is achieved by a mobile radio telecommunication network and a method for allocating a channel requested for a telecommunication link via a telecommunication network between a caller and a called party. Preferentially, a physical channel having a different wanted-to-unwanted signal ratio is selected when a data channel is requested than when a voice channel is requested.

9 Claims, 1 Drawing Sheet

ALLOCATION OF A CHANNEL FOR DATA CALLS WITH A DIFFERENT USEFUL SIGNAL/ DISTURB SIGNAL RATIO THAN FOR CHANNELS USED FOR VOICE CALLS IN MOBILE RADIO NETWORKS

BACKGROUND OF THE INVENTION

The invention relates to a method for allocating channels requested for a telecommunication link via a telecommunication network between a caller and a called party, and a device for carrying out the method. It also relates to a planning method for allocating channels requested for a telecommunication link via a telecommunication network between a caller and a called party. In particular, it relates to the allocation of a channel for an air interface in a mobile radio network.

Mobile radio telecommunication networks are known, for example, from the ETSI GSM Recommendations.

From the book by Jacek Biala, 1996 edition, ISBN 3-528-15302-4, page 76, 3.4.1, it is known that a traffic channel (abbreviated to "logical channel" or "channel" in the text which follows), which is also called TCH or user channel, can be used as voice channel or data channel. A logical channel can be operated in each case in full-rate mode or in half-rate mode both as voice channel and as data channel. The transmission via a data channel can be both circuit-switched and packet-switched. Logical channels are mapped onto physical channels. A physical channel is characterized by a time slot and a frequency or a number of frequencies, respectively. A logical channel can contain a number of physical channels. In a multi-slot configuration, a number of time slots are used for one logical channel.

The intensity of interference with a transmission via a "physical channel" by transmissions via other physical channels of identical or adjacent frequencies in the same mobile radio cell or an adjacent one depends on the wanted-to-unwanted signal ratio. The W/UNW ratio is given by the own transmitted power (wanted signal) and the unwanted signals from the adjacent radio cells. The unwanted signals are determined by the transmitting power of the interference source (mobile station or base station), the propagation conditions and the spatial distance between the interference source and the disturbed system.

SUMMARY OF THE INVENTION

The object of the present invention is, for a mobile radio network predetermined with respect to the available frequencies, the optimized utilization of the capacities taking into consideration the different quality requirements for data and voice calls in the allocation of requested channels. The object is achieved by the subject matters of the independent claims.

By preferentially selecting a physical channel having another (=different), particularly better wanted-to-unwanted signal ratio when requesting a data channel than when requesting a voice channel, the utilization of existing capacities (especially of frequencies) is optimized since the requirements for the wanted-to-unwanted signal ratio are different for data channels than for voice channels. The invention is significant especially for allocating a physical channel for an air interface ($U_m$) in a mobile radio network. In the text which follows it is assumed that data calls need a higher W/UNW ratio than voice calls. This correspondingly applies in the reverse case. The better W/UNW ratio of a data channel in comparison with a voice channel is achieved, in particular, by the fact that in a mobile radio cell, a physical channel is in each case allocated to a data channel the disturbance of which by physical channels at identical and/or adjacent frequencies is less than in the case of physical channels to be preferentially allocated to voice channels. By voice channel, a channel requested for the transmission of voice is meant. A data channel is a channel requested (or possibly just used after observation of the mobile radio telecommunication network) for the transmission of data. A channel (voice channel or data channel) is, as already stated above, a traffic channel or TCH or user channel according to GSM or a comparable channel in other mobile radio networks or a channel still to be defined in future mobile radio standards. The request of a channel for voice or data is made by a subscriber (the caller, as a rule) in the mobile radio network. After channel allocation, the telecommunication link is set up between at least two subscribers.

The method can be implemented in a mobile radio telecommunication network by designing the allocation devices there in such a manner that when a data channel is requested, a physical channel having a better wanted-to-unwanted signal ratio is preferably selected than when a voice channel is requested, especially in accordance with the claims for the main method claim.

Allocation devices in the mobile radio telecommunication network can be all devices which are involved singly or jointly in the allocation of a channel in one or more radio cells. In particular, they can be devices such as a BSC, MSC, BTS, other facilities or a number of aforementioned facilities in combination.

BRIEF DESCRIPTION OF THE DRAWING

Further features and advantages of the invention are obtained from the subsequent description of an exemplary embodiment, referring to the drawing, in which.

DETAILED DESCRIPTION OF THE PREFERRED EMBODIMENTS

Figure 1:
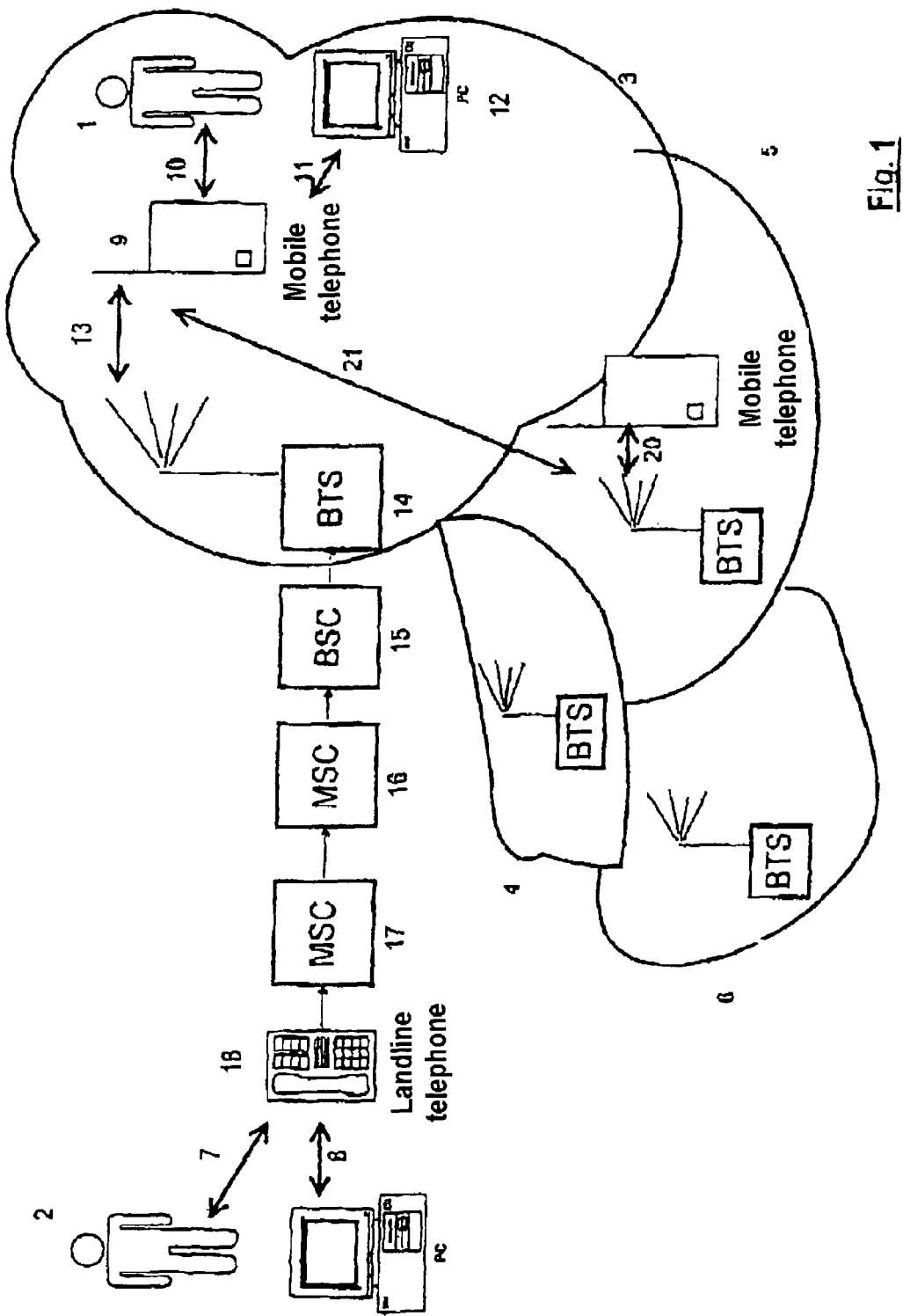
FIG. 1 diagrammatically shows a channel between two telecommunication subscribers which can be used as data channel or voice channel.

FIG. 1 shows two subscribers 1, 2, of which subscriber 1 is here located in a mobile radio network, namely radio cell 3 of the mobile radio network, radio cell 3 being surrounded by a few adjacent radio cells 4, 5, 6 shown by way of example, of which radio cells 4, 5 are immediately adjacent to radio cell 3 whereas radio cell 6 is indirectly adjacent to radio cell 3.

Subscriber 2 here has a landline connection (PSDN/ISDN etc.) which can be used for voice transmission 7 and (from a PC) for data transmission 8. The mobile radio subscriber 2 can also be located in a mobile radio network instead of a landline network. Subscriber 1 can communicate with subscriber 2 via the mobile radio network via his mobile radio terminal 9 in voice 10 or from his PC 12 (also via the mobile radio terminal 9, e.g. mobile telephone) in the form of transmitting and/or receiving data (not voice-related). In this arrangement, the mobile radio terminal 9 communicates with the BTS 14 of the mobile radio network via radio interface 13 ($U_m$) From BTS 14, the telecommunication link of the subscriber 1 continues via BSC 15, the MSCs 16 and 17 to the landline terminal 18 of subscriber 2.

Subscriber 1 communicates with subscriber 2 via the radio interface 13 via a traffic channel=TCH=user channel.

The traffic channel can be a full-rate or half-rate channel. Via such a channel, voice can be transmitted in which case it is called a voice channel and data can be transmitted in which case it is called a data channel. This is thus not a data channel like a short message service channel but a traffic channel.

From the immediately adjacent radio cells 4, 5 and the indirectly adjacent radio cell 6, data or voice are also transmitted to subscribers located in these radio cells 4, 5, 6 via radio interfaces. In this process, a radio signal 20 from a radio cell 4, 5 or 6 is also propagated as unwanted signal 21 into the radio cell 3 of subscriber 1. If it is intended to transmit from subscriber 1 to subscriber 2 via the radio interface 13 in such a manner that the physical channel 13 is used as data channel, the requirements for the wanted-to-unwanted signal ratio (13 to 21) are greater than when the physical channel 13 is used as voice channel. The wanted-to-unwanted signal ratio is the ratio of the received powers of the wanted signal 13 transmitted via the data channel to a signal acting as unwanted signal 21, particularly from an adjacent radio cell 4 or 5.

To be able to optimize the increased requirements for the wanted-to-unwanted signal ratio in data channels in an existing mobile communication network, a physical channel is preferably allocated as data channel if it has a better wanted-to-unwanted signal ratio than other physical channels due to the frequency distributions in radio cells which are directly and/or indirectly adjacent. The allocation to good physical channels can be "preferential" in as much as it takes place if channels which are good with respect to the W/UNW ratio are free of can be cleared of voice calls.

The planning for a mobile radio network should take place in such a manner that the necessary W/UNW ratios for data and voice calls are guaranteed in the area of the serving radio cells. This can be achieved, among other things, by avoiding issuing identical and/or adjacent frequencies in adjacent radio cells. It depends on different spatial situations such as radio cell sizes, impediments to wave propagation (buildings, mountains, etc.) and transmitting powers in which directly or indirectly adjacent radio cells a co-frequency and/or adjacent-frequency exclusion (i.e. the exclusion of issuing the same and/or the adjacent frequency within two radio cells) is defined. The prerequisites for directly or indirectly adjacent radio cells in a mobile radio network are implemented on the basis of various planning models in planning the mobile radio network.

According to the invention, physical channels are allocated to the data channels which have a better wanted-to-unwanted signal ratio with regard to unwanted signals from other radio cells (which are user signals there), than physical channels which are allocated to voice channels. Which physical channels can be used as data channels and which can be used as voice channels can be predetermined once or can be dynamically adapted. The wanted-to-unwanted signal ratio can be theoretically determined. In particular, the wanted-to-unwanted signal ratio can also be determined by measurements for the different frequencies in the radio cells and used as bases for the decisions in allocating physical channels.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for allocating a channel requested for a telecommunication link via a telecommunication network between a caller and a called party, the method comprising the steps of:

selecting at least one physical channel having a different wanted-to-unwanted signal ratio when a data channel is requested than when a voice channel is requested such that at least one physical channel having a better wanted-to-unwanted signal ratio is preferentially selected when a data channel is requested than when a voice channel is requested, wherein the better wanted-to-unwanted signal ratio of a data channel compared with a voice channel is achieved by allocating, in a mobile radio cell, at least one physical channel in each case to a data channel a disturbance of which by physical channels of at least one of identical and adjacent frequencies in adjacent radio cells is less than in the case of other physical channels; and allocating the selected physical channel for an air interface in a mobile radio network.

2. A method as defined in claim 1, including allocating a number of physical channels to one data channel.

3. A method as defined in claim 1, wherein the data channel is one of a bidirectional and unidirectional simplex or duplex channel connected between the caller and the called party.

4. A method as defined in claim 1, including packet-switching data transmission between the caller and the called party.

5. A method for planning a mobile radio network, comprising selecting at least one physical channel having a different wanted-to-unwanted signal ratio for a data channel than for a voice channel, said step of selecting including achieving the different wanted-to-unwanted signal ratio of a data channel compared with a voice channel by allocating in a mobile radio cell in each case at least one physical channel to a data channel having disturbance by physical channels of the same and/or adjacent frequencies in adjacent radio cells that is less than in other physical channels.

6. A method for planning a mobile radio network, comprising selecting at least one physical channel having a better wanted-to-unwanted signal ratio for a data channel than for a voice channel, said step of selecting including achieving the better wanted-to-unwanted signal ratio of a data channel compared with a voice channel by allocating in a mobile radio cell in each case at least one physical channel to a data channel having disturbance by physical channels of the same and/or adjacent frequencies in adjacent radio cells that is less than in other physical channels.

7. A mobile radio telecommunication network, comprising a plurality of adjoining mobile radio cells having channel allocation devices for allocating requested channels to at least one of a caller and a called party, the channel allocation devices being operative so that at least one physical channel having a better wanted-to-unwanted signal ratio is selected when a data channel is requested than when a voice channel is requested, wherein the allocation devices are operative to select the better wanted-to-unwanted signal ratio of a data channel compared with a voice channel by allocating in a mobile radio cell in each case at least one physical channel to a data channel, the disturbance of which by physical channels of at least one of identical and adjacent frequencies in adjacent radio cells is less than in other physical channels, the allocation of the selected physical channel being effected for an air interface in a mobile radio network.

8. A mobile radio telecommunication network as defined in claim 7, wherein a number of physical channels are allocated to one data channel.

9. A mobile radio telecommunication network as defined in claim 7, wherein the data channel is one of a bidirectional and unidirectional simplex or duplex channel connected between the caller and the called party.

* * * * *

UNITED STATES PATENT AND TRADEMARK OFFICE
CERTIFICATE OF CORRECTION

| | | |
|---|---|---|
| PATENT NO. | : 6,965,768 B1 | Page 1 of 1 |
| APPLICATION NO. | : 09/787618 | |
| DATED | : November 15, 2005 | |
| INVENTOR(S) | : Martin Keller | |

It is certified that error appears in the above-identified patent and that said Letters Patent is hereby corrected as shown below:

Please replace the listing of inventors on the Title page of the above-identified patent with the following listing:

--(75)  Martin Keller, Hamburg (DE); Frank Lambrecht, Düsseldorf (DE); Stefan Leinenbach, Düsseldorf (DE); Joachim Richter, Hilden (DE); Robert Wahsner, Düsseldorf (DE)--

Signed and Sealed this

Fourth Day of March, 2008

JON W. DUDAS
*Director of the United States Patent and Trademark Office*